US009774447B2

(12) United States Patent
Walker et al.

(10) Patent No.: US 9,774,447 B2
(45) Date of Patent: Sep. 26, 2017

(54) ONLINE IDENTIFICATION AND AUTHENTICATION

(75) Inventors: Jesse Walker, Portland, OR (US); Gyan Prakash, Beaverton, OR (US); David Stanasolovich, Albuquerque, NM (US); James R. Gregg, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,102

(22) PCT Filed: Apr. 9, 2012

(86) PCT No.: PCT/US2012/032754
§ 371 (c)(1),
(2), (4) Date: Sep. 17, 2014

(87) PCT Pub. No.: WO2013/154525
PCT Pub. Date: Oct. 17, 2013

(65) Prior Publication Data
US 2015/0019869 A1 Jan. 15, 2015

(51) Int. Cl.
*G06F 21/00* (2013.01)
*H04L 29/06* (2006.01)
(Continued)

(52) U.S. Cl.
CPC ............ *H04L 9/0819* (2013.01); *G06F 21/33* (2013.01); *G06Q 20/382* (2013.01);
(Continued)

(58) Field of Classification Search
CPC . H04L 9/0819; H04L 9/3263; H04L 63/0823; H04L 9/30; H04L 9/3239;
(Continued)

(56) References Cited

U.S. PATENT DOCUMENTS

2003/0055894 A1  3/2003 Yeager et al.
2003/0056094 A1  3/2003 Huitema et al.
(Continued)

FOREIGN PATENT DOCUMENTS

CN      101039182 A    9/2007
CN      101442522 A    5/2009
(Continued)

OTHER PUBLICATIONS

International Preliminary Report on Patentability received for PCT Patent Application No. PCT/US2012/032754, mailed on Oct. 23, 2014, 8 pages.
(Continued)

*Primary Examiner* — Lisa Lewis
(74) *Attorney, Agent, or Firm* — Jordan IP Law, LLC

(57) ABSTRACT

Systems and methods may provide for online identification and authentication. In one example, the method may include generating a credential to represent a relationship based on a common ground of authenticated communication between a first user and a second user, identifying the second user to the first user, authenticating the relationship of the second user to the first user, and initiating, upon authentication, a communication between the first user and the second user.

16 Claims, 7 Drawing Sheets

(51) Int. Cl.
  H04L 9/08     (2006.01)
  H04L 9/32     (2006.01)
  H04L 9/30     (2006.01)
  G06Q 20/38    (2012.01)
  G06Q 20/40    (2012.01)
  G06F 21/33    (2013.01)

(52) U.S. Cl.
  CPC ..... *G06Q 20/3821* (2013.01); *G06Q 20/3827* (2013.01); *G06Q 20/40* (2013.01); *H04L 9/30* (2013.01); *H04L 9/3239* (2013.01); *H04L 9/3263* (2013.01); *H04L 63/0823* (2013.01); *G06F 2221/2117* (2013.01); *G06Q 2220/00* (2013.01); *H04L 63/061* (2013.01); *H04L 2209/24* (2013.01)

(58) Field of Classification Search
  CPC ... H04L 63/061; H04L 2209/24; G06F 21/33; G06F 2221/2117; G06Q 20/3821; G06Q 20/40; G06Q 20/3827; G06Q 20/382; G06Q 2220/00
  See application file for complete search history.

(56) References Cited

U.S. PATENT DOCUMENTS

2006/0004789 A1* 1/2006 Lunt ..................... H04L 63/102

2010/0093310 A1* 4/2010 Gbadegesin ........ H04L 63/0807
                                                         455/411
2010/0211795 A1   8/2010 Brown et al.
2011/0035677 A1   2/2011 Vitale et al.
2011/0319058 A1* 12/2011 Ankolekar .............. H04W 4/08
                                                         455/414.1

FOREIGN PATENT DOCUMENTS

| JP | 2001188757 A | 7/2001 |
| JP | 2011508291 A | 3/2011 |
| JP | 2011123601 A | 6/2011 |
| WO | 2013154525 A1 | 10/2013 |

OTHER PUBLICATIONS

International Search Report and Written Opinion received for PCT application No. PCT/US2012/032754, mailed on 26, 2012, 11 pages.

Office Action received for Japanese Patent Application No. 2015-504539, mailed Sep. 15, 2015, 4 pages including 2 pages of English translation.

Extended European Search Report received for European Patent Application No. 12874091.7, mailed Nov. 30, 2015, 7 pages.

Office Action for Japanese Patent Application No. 2016-024191, mailed on Dec. 6, 2016, 6 pages including 3 pages of English translation.

* cited by examiner

ONLINE IDENTIFICATION AND AUTHENTICATION

BACKGROUND

Technical Field

Embodiments generally relate to online identification and authentication of a user. More particularly, embodiments relate to utilizing personal credentials (e.g., personal key pairs, online identities) to dynamically identify and authenticate a familiar user.

Discussion

Public key infrastructure may utilize credentials (e.g., certificates) issued by a certificate authority (CA) to establish a basis of trust. However, a challenge with utilizing public key infrastructure may be that while credentials may authenticate the identity of a first user with respect to the certificate authority, the first user may not authenticate herself to a user with credentials issued by a second certificate authority. Furthermore, if the first user also has credentials issued by the second certificate authority (as well as the first), the first user may not be able to use either to authenticate herself to the second user.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
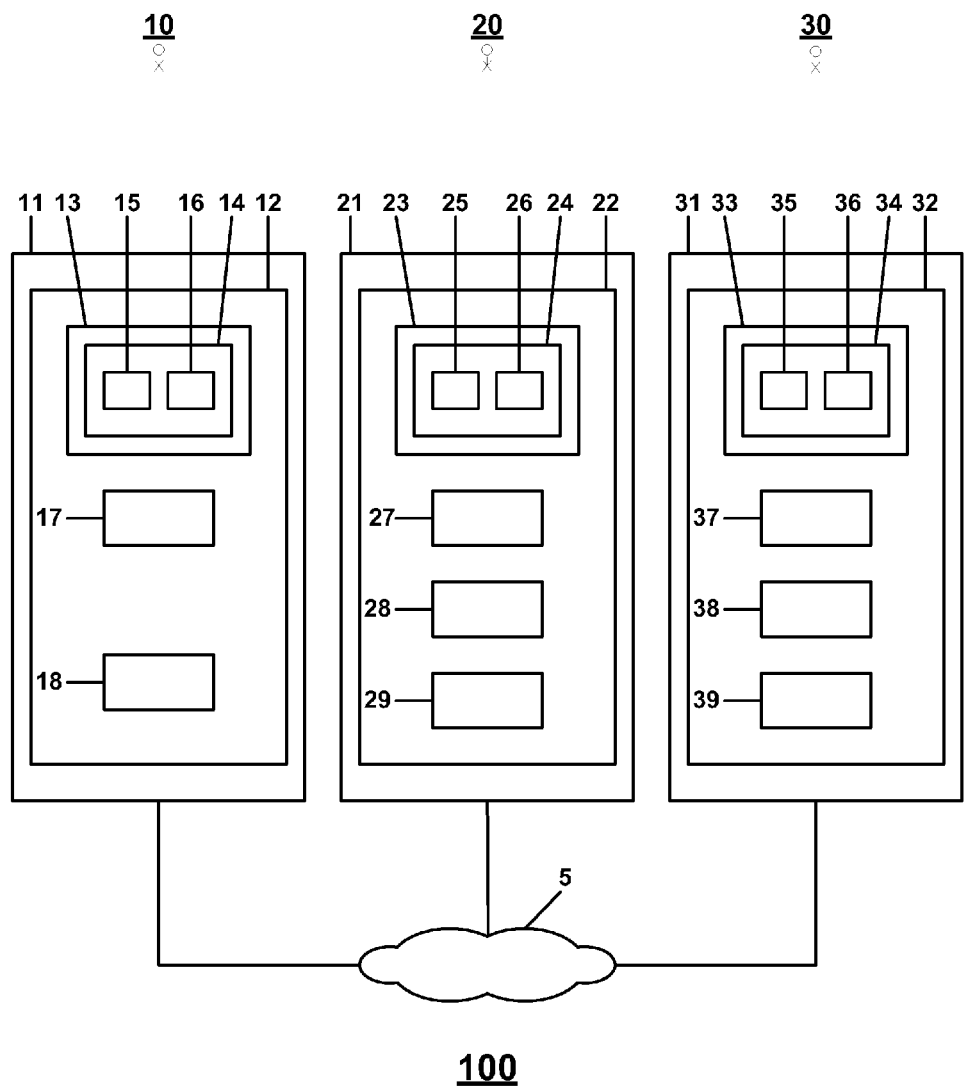
FIG. 1 is a block diagram of an example of a first computing system that is to dynamically identify and authenticate a familiar user in accordance with an embodiment of the invention.

Turning now to FIG. 1, a block diagram of an example of a computing system that may be configured to dynamically identify and authenticate a familiar user is shown. The computing system 100 may include a first user device 11 operated by a first user 10, a second user device 21 operated by a second user 20, and a third user device 31 operated by a third user 30. The first user device 11, the second user device 21, and the third user device 31 may be coupled to a network 5, such as the Internet. In this example, the first user 10 may be an employer, and may employ the second user 20 and the third user 30.

The first user device 11, the second user device 21, and the third user device 31 may be any device capable of begin coupled to and communicating with another user device. In this example, the first user device 11 may be a desktop computer, the second user device 21 may be a mobile device (e.g., a mobile/smart phone, a personal digital assistant, a smart tablet device), and the third user device 31 may be a notebook computer. The first user device 11, the second user device 21, and the third user device 31 may include a first user device memory 12, a second user device memory 22, and a third user device memory 32, which may be used to store various data. Also, in this example, the first user device 11, the second user device 21, and the third user device 31 may communicate via a wired Ethernet connection.

Generally, in embodiments of the present invention, a credential, (e.g., a certificate) may, among other things, represent a shared ground of authenticated communication between an issuing user and a receiving user (hereinafter, the issuer and the receiver may refer to each other as a "familiar" user), and authenticate a user's identity. Upon authentication, the users may, among other things, authorize and implement (secure) communications, and conduct (secure) transactions.

For example, in the present example, the first user employer 10 may hold a first user certificate 13, and may issue a second user certificate 23 to the second user 20, and a third user certificate 33 to the third user 30 respectively. The second user certificate 23 and the third user certificate 33 may be issued to authenticate that the second user 20 and the third user 30 are employees of the first user (i.e., a first ground of authenticated communication).

The first user certificate 13 may include a first user key pair 14, having a first user public key 15 and a first user private key 16. The second user certificate 23 may include a second user key pair 24, having a second user public key 25 and a second user private key 26. The third user certificate 33 may include a third user key pair 34, having a third user public key 35 and a third user private key 36. The first user certificate 13 may be stored on the first user device memory 12, the second user certificate 23 may be stored on the second user device memory 22, and the third user certificate 33 may be stored on the third user device memory 32.

The second user employee 20 may also exchange the second certificate 22 with the third user employee 30 to identify and authenticate her relationship to the third user employee 30 as a fellow employee (i.e., the first ground of authenticated communication). Also, for example, upon receiving authentication, the second user 20 may, for example, access a secure communication line, and send an employment-related confidential document to the third user 30. The certificates 23, 33 may also be utilized in contexts different than those in which they were originally issued or exchanged. That is, a certificate, once authenticated based on a first ground of authenticated communication, may then be used to authenticate communication between the two parties on any other ground of authenticated communication.

In embodiments of the present invention, any user may issue or receive a certificate from another user based on a particular ground of authenticated communication (e.g., friend, acquaintance, social club). Each new certificate, relating to each new ground of authenticated communication, may be utilized to identify and authenticate a user. Upon authentication, the certificates may be used to authorize and conduct a (secure) communication with a familiar user, and implement a (secure) transaction with a familiar user. So, for example, upon authenticating each other as fellow employees, the second user 20 and the third user 30 may issue certificates to each other to represent a second ground of authenticated communication (e.g., a friend). Specifically, the second user 20 may issue the third user 30 a fourth certificate 27, and the third user 30 could issue the second user 20 a fifth certificate 37.

Furthermore, any issued certificate may serve as the basis of an introduction between any two parties as well. More specifically, any first party that shares a common relationship with a second party and a common relationship with a third party may utilize a certificate to authenticate the common relationships and conduct an introduction. So for example, in the example described above, the second user 20 may utilize the fourth certificate 27 to introduce the third user 30 to any other party (e.g., another friend) to whom the second user 20 has issued a certificate.

Consequently, a user may accumulate many different certificates for use in many different contexts. Each unique ground of authenticated communication (and, by extension, each certificate issued or received) may correspond to a separate, distinct user identity. The totality of these individual identities may represent a user's cumulative identity. Embodiments of the present invention may further provide for use of algorithms to generate an identity contact expression to describe a user's cumulative identity. An identity contact expression may, among other things, account for and incorporate all certificates affiliated with a user, over any and all grounds of communication. A generated identity contact expression may (utilizing the incorporated certificates) identify a user who shares a common ground of authenticated communication and authenticate the familiar user's identity. Upon authentication, the identity contact expression may be used to establish a basis for (secure) communication with the familiar user, and conduct an (secure) transaction with a familiar user. Moreover, the generation of an identity contact expression may be dynamic, in that it may be continuously regenerated to account for a user's changing cumulative identity.

For example, the first user 10 may utilize a first user identity contact expression application 17 to generate a first user identity contact expression 18. Similarly, the second user 20 may utilize a second user identity contact expression application 28 to generate a second user identity contact expression 29, and the third user 30 may utilize a third user identity contact expression application 38 to generate an third user identity contact expression 39. An identity contact expression application may be downloaded to a user device from any coupled device, or may be present at the time of the purchase of the user device.

The arrangement and numbering of blocks depicted in FIG. 1 is not intended to imply an order of operations to the exclusion of other possibilities. Those of skill in the art will appreciate that the foregoing systems and methods are susceptible of various modifications and alterations.

For example, in the embodiment described above, the first user device 10, the second user device 21, and the third user device 31 may communicate via a wired Ethernet connection. However, in other embodiments, one or more of these device may communicate via a wireless connection such as near field communication protocol, a wireless data connection (e.g., IEEE 802.11, 1999 Edition, LAN/MAN Wireless LANS (WiFi), IEEE 802.16-2004, LAN/MAN Broadband Wireless LANS (WiMAX), Bluetooth (e.g., IEEE 802.15.1-2005, Wireless Personal Area Networks), Zigbee (IEEE 802.15.4), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances.

Figure 2:
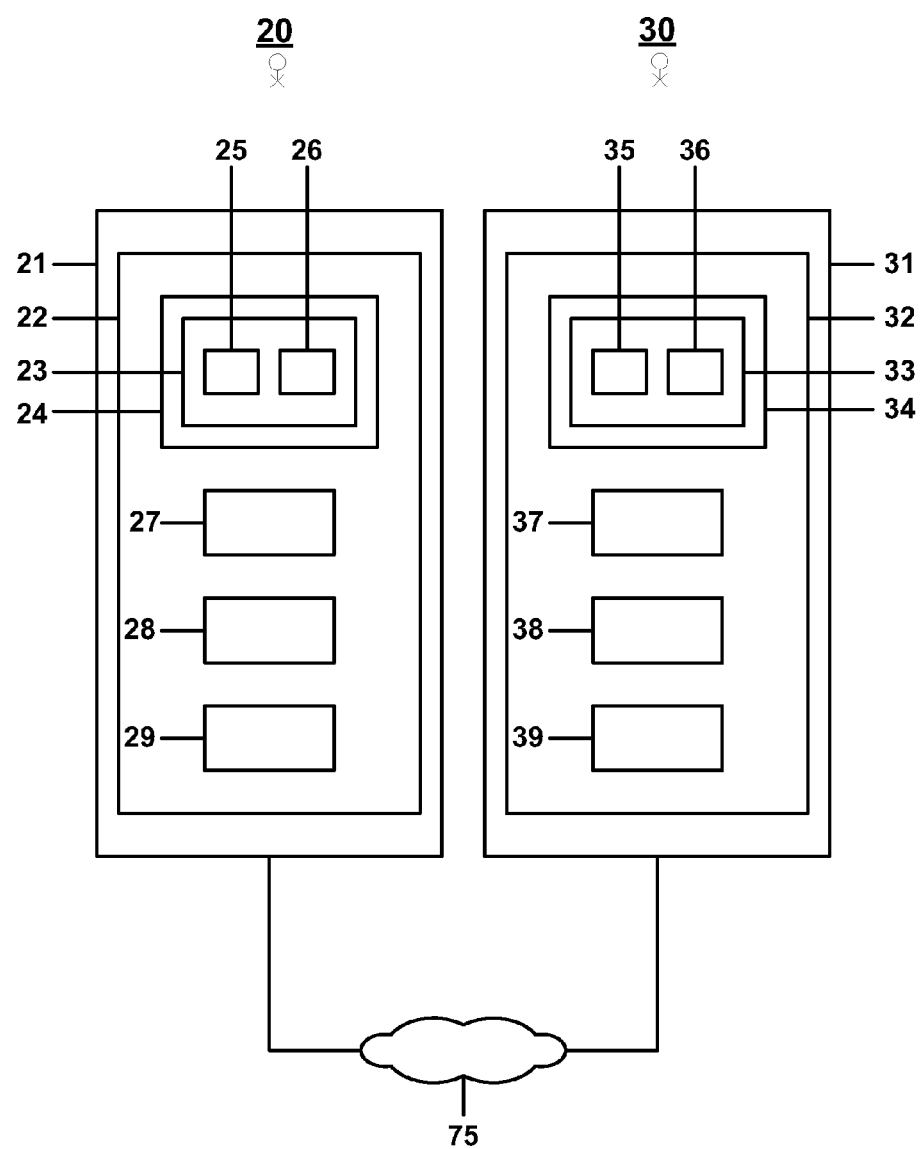
FIG. 2 is a block diagram of an example of a second computing system that is to dynamically identify and authenticate a familiar user in accordance with an embodiment of the invention.

Turning now to FIG. 2, a block diagram of an example of a computing system configured to dynamically identify and authenticate a familiar user is shown. In this example, the second user 20 (as discussed in FIG. 1) may operate the second user device 21 (i.e., the mobile device), and the third user 30 (as discussed in FIG. 1) may operate the third user device 31 (i.e., the notebook computer). Both devices may coupled to a wireless network 75 maintained by a commercial establishment (e.g., a coffee shop). In this example, after having previously exchanged certificates (i.e., fourth certificate 27 and fifth certificate 37), the second user 20 and the third user 30 may visit the commercial establishment at the same time.

The second user 20 may access the wireless network 75 to identify that the third user device 31 is on the wireless network 75, and access the third user identity contact expression 39. Similarly, the third user 30 may access the wireless network 75, and identify that the second user device 21 is on the wireless network 75, and access the second user identity contact expression 29. In this embodiment, the second user identity contact expression 29 may include information relating to the fifth certificate 37, and the third user identity contact expression 39 may include information relating to the fourth certificate 27.

As discussed above, the second user 20 and the third user 30 may utilize the second user identity contact expression 29 and the third user identity contact expression 39 to authenticate a preexisting relationship (i.e., a friend). Furthermore, upon authentication, the two parties may also utilize the identity contact expressions 29, 39 to implement a secure communication (i.e., an online chat), or conduct a secure transaction (i.e., a document transfer), for example, over the wireless network 75.

Figure 3:
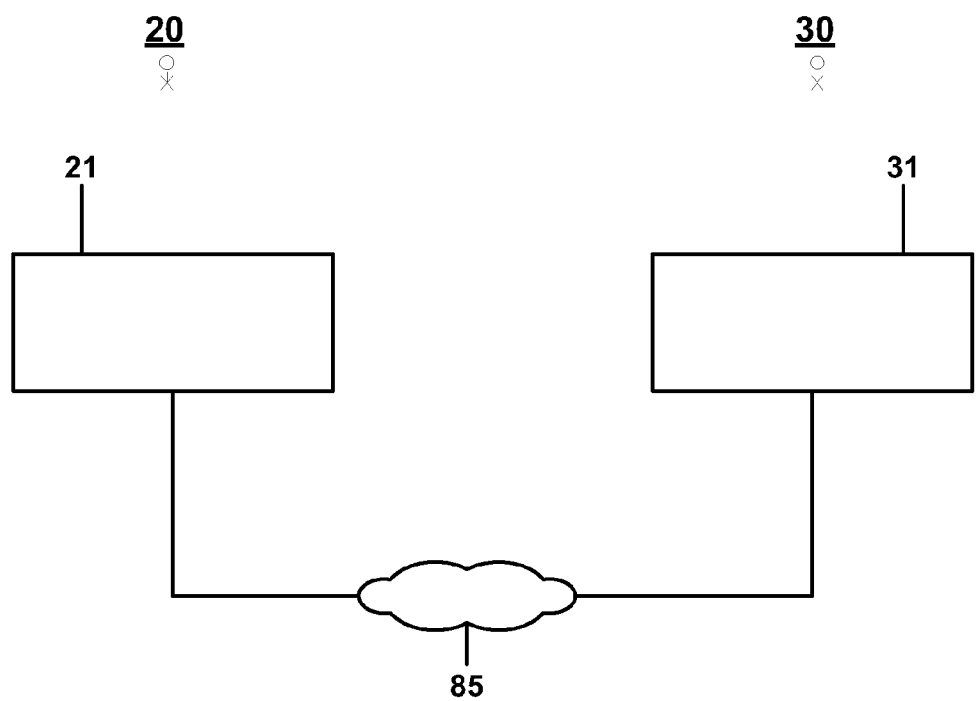
FIG. 3 is a block diagram of an example of a third computing system that is to dynamically identify and authenticate a familiar user in accordance with an embodiment of the invention.

Turning now to FIG. 3, a block diagram of an example of a computing system using identity contact expressions to identify a familiar user and transmit a communication is shown. The system may include may include a wireless network 85, the second user device 21 (i.e., a mobile device, as discussed in FIG. 1) operated by the second user 20, the third, user device 31 (i.e., the notebook computer, as discussed in FIG. 1) operated by the third user 30. In this example, the second user 20 may be seeking to send an employment-related email to the third user 30. The third user's name may be John Smith.

The second user 20 may access an email directory to find that there are ten people named John Smith. To the determine target recipient, the second user 20 may access the identity contact expression of each user named John Smith. In doing so, the second user 20 may be able to identify which of these people the second user 20 has a preexisting relationship with, and what the nature of the relationship is. In addition, if relevant, the second user 20 may also be able to identify which users the second user 20 and the third user 30 both share relationships with. Utilizing this information, the second user may then use that information to select the correct John Smith (i.e., the third user 30) to send the employment-related email to.

Figure 4:
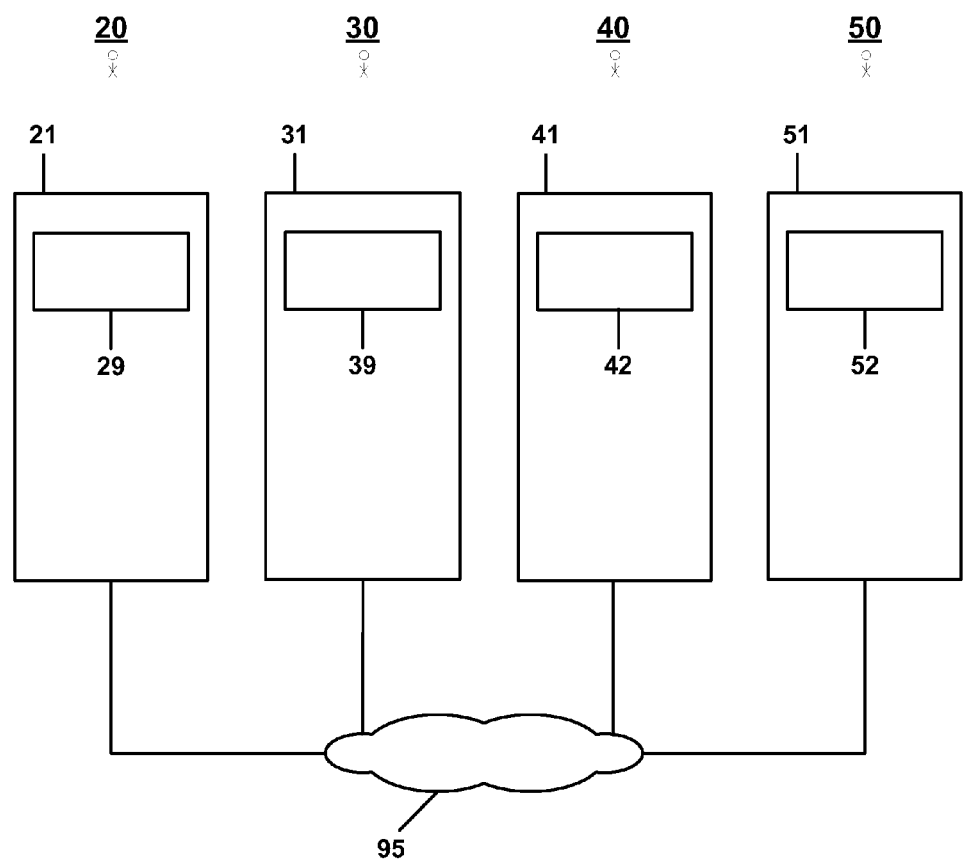
FIG. 4 is a block diagram of an example of a fourth computing system that is to dynamically identify and authenticate a familiar user in accordance with an embodiment of the invention.

Turning now to FIG. 4, a block diagram of an example of a computing system using issued certificates to dynamically identify and authenticate a familiar user is shown. The system may include may include a wireless network 95, the second user device 21 (i.e., a mobile device, as discussed in FIG. 1) operated by the second user 20, the third user device 31 (i.e., the notebook computer, as discussed in FIG. 1) operated by the third user 30. As discussed above, the second user 20 and the third user 30 may utilize the second user identity contact expression 29 and the third user identity contact expression 39. The system may also include a fourth user device 41 (e.g., a tablet device) operated by a fourth user 40, and a fifth user device 51 (e.g., a notebook device) operated by a fifth user 50. The fourth user 40 may utilize a fourth user identity contact expression 42, and the fifth user 50 may utilize a fifth user identity contact expression 52.

In this example, the second user 20, the third user 30, the fourth user 40, and the fifth user 50 may all be employees of the same employer (e.g., the first user 10). Accordingly, they all may have a first common ground of authenticated communication (i.e., common employment), represented by certificates issued by the first user employer 10. The certificates issued by the first user employer 10 may be accounted for in their respective identity contact expressions. Separately, the second user 20 and the third user 30 may, separately, share a second common ground of authenticated communication (e.g., as friends).

So, in this example, if the second user 20 and the third user 30 are having a work-related online chat, the fourth user 40 and the fifth user 50 may utilize their identity contact expressions to be authenticated (based on their common ground of authenticated communication), and alerted to the chat. Indeed, in some embodiments, the fourth user 40 and the fifth user 50 may utilize their respective identity contact expression to take part in the chat. However, on the other hand, if the second user 20 and the third user 30 have a online chat relating to their common ground of authenticated communication as friends, the fourth user 40 and the fifth user 50 may not be able to utilize their respective identity contact expressions to be alerted to the chat. This may be so because they do not share the second common ground of authenticated communication (i.e., they do not have not share certificates issued or received on this ground), and consequently may not be authenticated on this ground of authenticated communication.

Figure 5:
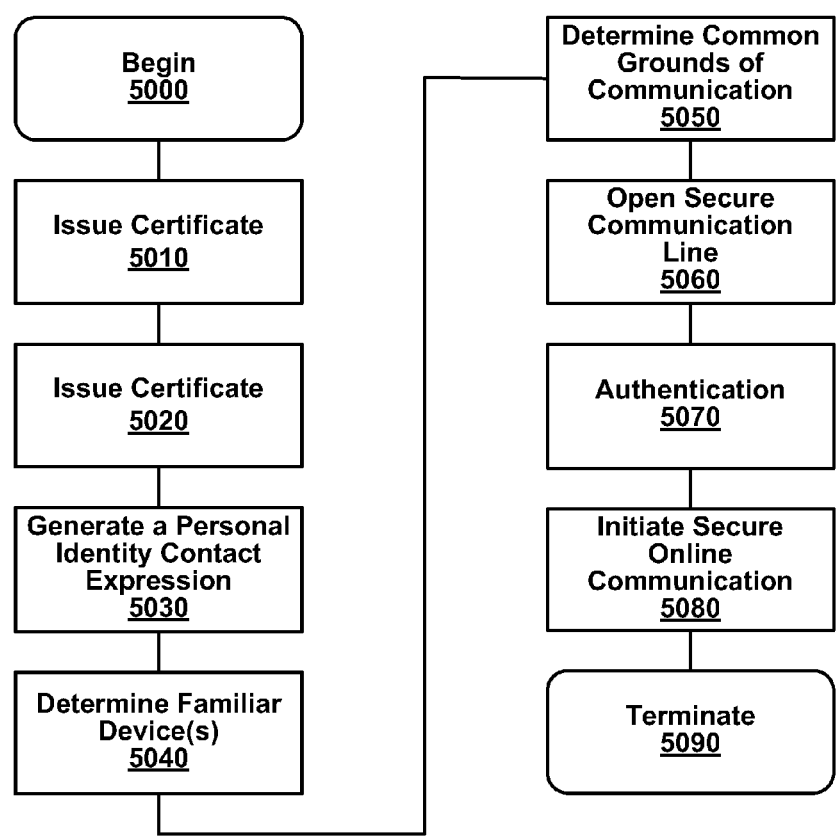
FIG. 5 is a flowchart of an example of a first method of dynamically identifying and authenticating a familiar user in accordance with an embodiment of the invention.

Turning now to FIG. 5, a flowchart of an example of a method of dynamically identifying and authenticating a familiar user is shown. The method might be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages.

In this example, an employer first user, such as first user 10 (FIG. 1), may utilize a first user device, such as the first user device 11 (FIG. 1). The first user device may be coupled to a second user employee, such as the second user 20 (FIG. 1), utilizing a second user device, such as the second user device 21 (FIG. 1). The first user device and the second user device may also be coupled to a third user employee, such as the third user 30, utilizing a third user device, such as the third user device 31 (FIG. 1). The first user device may store a first certificate, such as the first user certificate 13 (FIG. 1). The method begins at processing block 5000.

At processing block 5010, the first user may issue a certificate to each of the employees to establish and authenticate a first ground of authenticated communication (i.e., as employees), and to utilize these certificates as a basis for future transactions. Specifically, the first user employer may issue a second certificate, such as the second certificate 23 (FIG. 1), to the second user, and a third certificate, such as the third certificate 33 (FIG. 1), to the third user.

At processing block 5020, the second user and the third user may issue certificates to each other to establish and authenticate a second ground of authenticated communication (e.g., as friends). Specifically, the second user could issue the third user a fourth certificate, such as the fourth certificate 27 (FIG. 1). Similarly, the third user could the second user a fifth certificate, such as the fifth certificate 37 (FIG. 1). At processing block 5030, each of the first user, the second user, and the third user may utilize an identity contact expression application, such as the second user identity contact expression application 28 (FIG. 1), to generate a personal identity contact expression, such as the second user identity contact expression 29 (FIG. 1).

At processing block 5040, at a later time, the second user may utilize at least one of the second user identity contact expression and the second user identity contact expression application to determine if a familiar user is operating a coupled device. For example, the second user may retrieve the first user identity contact expression to identify the first user, and the third user identity contact expression to identify the third user. At processing block 5050, the second user may determine that he shares one common ground of authenticated communication with the first user (i.e., employer-employee), and two common grounds of communication with the third user (i.e., fellow employee, friend). At processing block 5060, the second user and the third user may authenticate themselves utilizing their identity contact expressions (and, by extension, their exchanged certificates on the ground of authenticated communication as friends). At processing block 5070, the second user may wish to open a secure online communication (i.e., an encrypted online chat) with the third user. At processing block 5080, the process may terminate.

The sequence and numbering of processing blocks depicted in FIG. 5 is not intended to imply an order of operations to the exclusion of other possibilities. Those of skill in the art will appreciate that the foregoing systems and methods are susceptible of various modifications and alterations. For example, in the example described above, the second user may open a secure online communication with the third user (i.e., processing block 5070). This need not necessarily be the case on other embodiments. Instead, the second user and the third user may initiate and implement a secure transaction (e.g., a secure document transfer).

Figure 6:
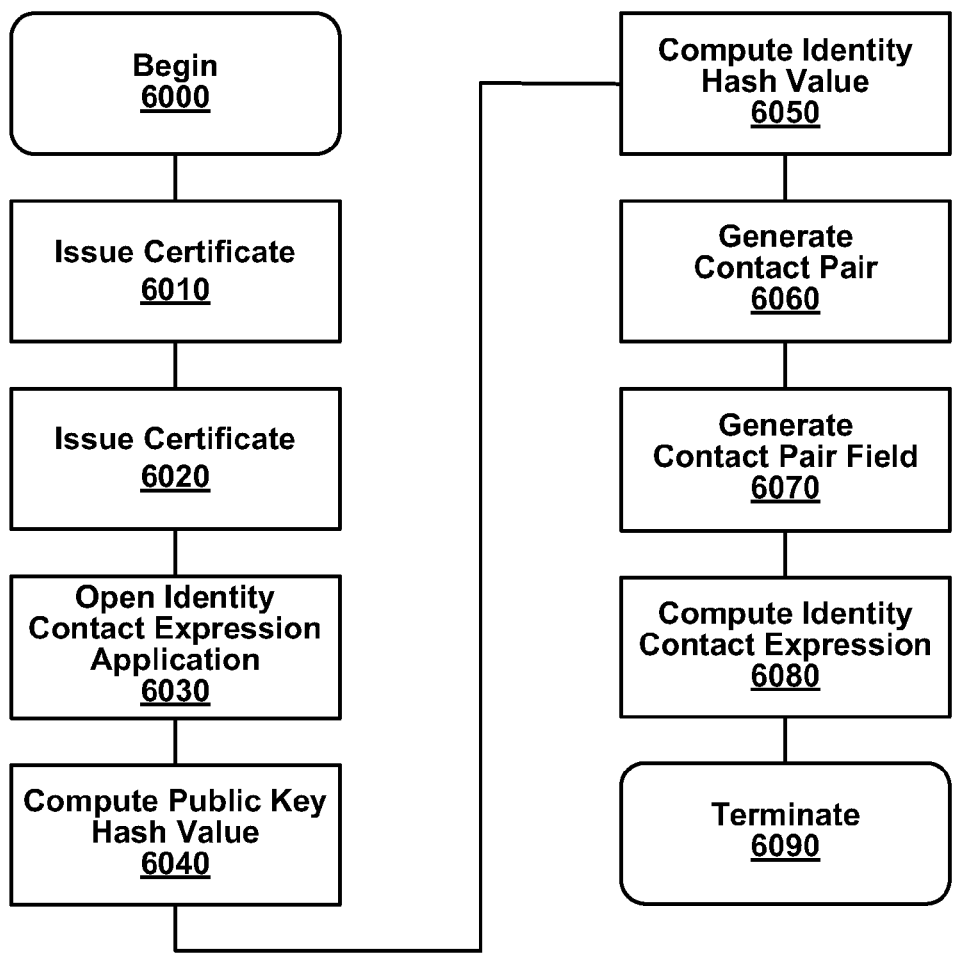
FIG. 6 is a flowchart of an example of a second method of dynamically identifying and authenticating a familiar user in accordance with an embodiment of the invention.

Turning now to FIG. 6, a flowchart of an example of a method of generating an identity contact expression is shown. The method might be implemented as a set of logic instructions stored in a machine- or computer-readable storage medium such as RAM, ROM, PROM, firmware, flash memory, etc., in configurable logic such as PLAs, FPGAs, CPLDs, in fixed-functionality logic hardware using circuit technology such as ASIC, CMOS or TTL technology, or any combination thereof. For example, computer program code to carry out operations shown in the method may be written in any combination of one or more programming languages, including an object oriented programming language such as Java, Smalltalk, C++ or the like and conventional procedural programming languages, such, as the "C" programming language or similar programming languages.

In this example, the first user Alice, such as the second user 20 (FIG. 1), may utilize a second user device, such as the second user device 21 (FIG. 1) to be coupled to a second user Bob, such as the third user 30 (FIG. 1), utilizing a second user device, such as the third user device 31 (FIG. 1). Also, in this example, Alice may also issue to herself a certificate (a "self-signed certificate") including a public key and an identity by which Alice identifies herself. The process for generating an identity contact expression for Alice may begin at processing block 6000.

At processing block 6010, Alice may issue the second user, Bob, a first certificate, such as the second certificate 22 (FIG. 1). The first certificate may include a first key pair, such as the second user key pair 24 (FIG. 1), and the first key pair may include a first public key, such as the second user public key 25 (FIG. 1) and a first private key, such as the second user private key 26 (FIG. 1).

At processing block 6020, Bob may issue Alice a second certificate. The second certificate may include a second key pair, which may include a second public key and a second private key. At processing block 6030, Alice may open an identity contact expression application, such as the identity contact expression application 28 (FIG. 1).

At processing block 6040, for each party that has issued a certificate to Alice (e.g., the second user), the identity contact expression application may utilize a cryptographic hash function with k bits (where k is a non-zero positive integer) to compute a public key hash value for a user. In this case, the public key of the issuer may be taken from the certificate issued to Alice by the second user.

At processing block 6050, for each party that has issued a certificate to Alice (e.g., the second user), the identity contact expression application utilizes a cryptographic hash function with k bits (where k is a non-zero positive integer) to compute an identity hash value for the second user. In this case, the identity of the issuer may be is taken from the certificate issued to Alice by the second user.

At processing block 6060, the identity contact expression application may generate a contact pair for each user that has issued Alice a certificate. In this case, a contact pair for Bob may comprise the public key hash value for Bob and the identity hash value for the second user.

At processing block 6070, the identity contact expression application may generate a contact pair field including the contact pairs representing all of the users (a non-zero positive integer n) that share a common ground of authenticated communication with the first user. For example, in this case, since each of the public key hash value and the identity hash value are k bits in length, each of the contact pairs in the contact pair field may represent elements in a Galois field. That is, in this example, the contact pair field for Alice may resemble a Galois field with n contact pairs, wherein n is a number greater than 0.

At processing block 6080, the identity contact expression application may compute a first user identity contact expression, such as the identity contact expression 29 (FIG. 1), utilizing the generated contact pair field. For example, in this case, the identity contact expression application may utilize any polynomial interpolation method, such as LaGrange interpolation, to compute the unique identity contact expression for the first user. More specifically, in this example, the identity contact expression application may generate a degree (n−1) polynomial passing through all of the n pairs as being the first user's contact identity expression. The degree (n−1) polynomial may, among other things, map the public key hash value for Bob to the identity hash value of the second user. At processing block 6090, the process may terminate.

The sequence and numbering of processing blocks depicted in FIG. 6 is not intended to imply an order of operations to the exclusion of other possibilities. Those of skill in the art will appreciate that the foregoing systems and methods are susceptible of various modifications and alterations. For example, in the example described above, the identity contact expression application may utilize a LaGrange interpolation method to compute the unique identity contact expression for Alice. This need not necessarily be the case. Other interpolation methods (e.g., Spline interpolation) may be used as well.

Figure 7:
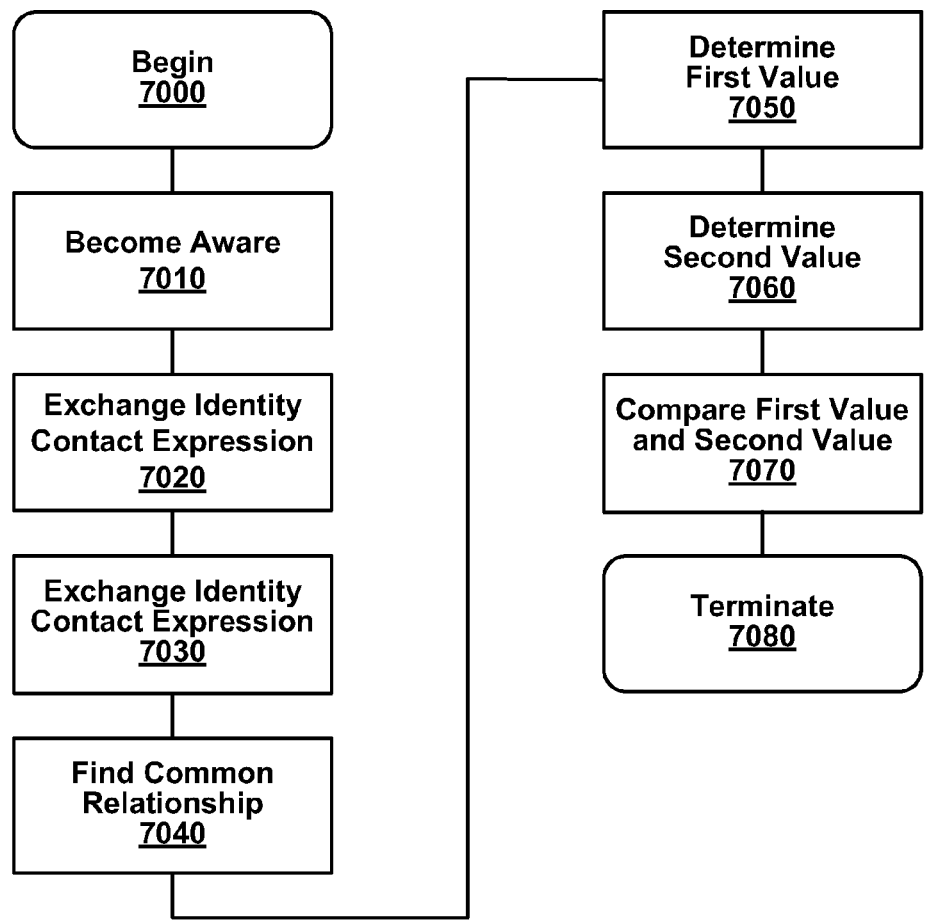
FIG. 7 is a flowchart of an example of a third method of dynamically identifying and authenticating a familiar user in accordance with an embodiment of the invention.

Turning now to FIG. 7, a flowchart of an example of a method of a first user to identify a familiar user utilizing an identity contact expression for a second user is shown. The method might be implemented as a set of logic instructions stored in a machine- or computer-readable storage medium such as RAM, ROM, PROM, firmware, flash memory, etc., in configurable logic such as PLAs, FPGAs, CPLDs, in fixed-functionality logic hardware using circuit technology such as ASIC, CMOS or TTL technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages.

In this example, a first user, such as the first user 10 (FIG. 1) may utilize a first user device, such as the first user device 11 (FIG. 1), to be coupled to a second user, such as the second user 20 (FIG. 1), utilizing a second user device, such as the second user device 21 (FIG. 1). The first user device and the second user device may be coupled to a third user, such as the third user 30 (FIG. 1), utilizing a third user device, such as the third user device 31 (FIG. 1). In this example, the first user may have a first user identity contact expression, such as the first user identity contact expression 17 (FIG. 1). The second user may have a second identity contact expression, such as the second user identity contact expression 29 (FIG. 1), and the third user may have a third identity contact expression, such as the third user identity contact expression 39 (FIG. 1).

In this example, the third user may utilize at least one of an identity contact expression application, such as the second user identity contact expression application 28, and the third identity contact expression to determine that both the second user and the third user have a common ground of authenticated communication with the first user.

Moreover, in this example, the first user may have previously exchanged a first user certificate, such as the first user certificate 13 (FIG. 1) with both the second user and the third user, which may be represented in both the second user identity contact expression and the third user identity contact expression. However, in this example, the second user and the third user have not exchanged any certificates. The process may begin at processing block 7000.

At processing block 7010, the second user and the third user may identify each other as available for communication (e.g., over a wireless network at a commercial establishment). At processing block 7020, a meet and greet protocol portion of an identity contact expression application located on the second user device may exchange the second user identity contact expression with the third user device. Similarly, at processing block 7030, a meet and greet protocol portion of an identity contact expression application located on the third user device may exchange the third user identity contact expression with the second user device.

At processing block 7040, utilizing the certificate issued to it by the first user, the identity contact expression application may determine a first value. In this example, the first value may be the value of the second user identity contact expression with respect a hash value of a public key in a certificate issued by the first user.

At processing block 7050, utilizing the certificate issued to it by the first user, the identity contact expression application may determine a second value. In this example, the second value may be the value of a hash value of an identity of the first user.

At processing block 7060, the identity contact expression application may compare the first value and the second value. If the first value and the second value are the same, then at processing block 7070, the second user and the third user may share a common relationship with the first user. If, on the other hand, the first value and the second value are not the same, then at processing lock 7080, the two parties may not share a common relationship with the first user. At processing block 7080, the process may terminate.

The sequence and numbering of processing blocks depicted in FIG. 7 is not intended to imply an order of operations to the exclusion of other possibilities. It will be evident to persons having the benefit of this disclosure that various modifications and changes may be made to these embodiments without departing from the broader spirit and scope of the embodiments described herein.

For example, in the example described above, the comparison described in processing block 7060 may be used to determine whether the second user and the third user may share a common relationship with the first user. However, this may not necessarily need to be the case. In other embodiments, an identity contact expression application may utilize a first value and a second value to determine that the second user and the third user share a common ground of authenticated communication, and have previously exchanged certificates.

Embodiments may therefore provide for a method of online identification and authentication, comprising generating a credential to represent a relationship between a first user and a second user based on a common ground of authenticated communication, exchanging the credential from the first user to the second user, and generating, utilizing the credential, a public key hash value for the second user. The method may also provide for generating, utilizing the credential, an identity hash value for the second user and generating, utilizing the public key hash value and the identity hash value, a contact pair. The method may further provide for generating, utilizing the contact pair, a contact pair field and generating, utilizing the contact pair field, an identity contact expression to a represent a cumulative identity for the first user.

In one example, the public key hash value for the second user and the identity hash value for the second user are generated utilizing a cryptographic hash function.

In one example, a cryptographic hash function utilized to generate the public key hash value is k bits long, wherein k is a non-zero positive integer.

In another example, a cryptographic hash function utilized to generate the identity hash value is k bits long, wherein k is a non-zero positive integer.

In one example, the contact pair field is represented by a Galois field with 2k elements, and the public key hash value and the identity hash value are interpreted as k-bit elements of this field.

In yet another example, the identity contact expression for the first user is generated utilizing a polynomial interpolation method.

In still another example, the identity contact expression is a polynomial mapping the public key hash value to the identity hash value.

In another example, the generation of the identity contact expression is dynamic.

Embodiments may also include at least one machine readable medium comprising a plurality of instructions that in response to being executed on a computing device, cause the computing device to carry out any of the examples of the aforementioned method, an apparatus for online identification and authentication comprising a device memory and logic configured to perform any of the examples of the aforementioned method, and a system for online identification and authentication comprising a first device memory. a second device memory. and logic configured to perform the method of any of the examples of the aforementioned method.

Another embodiment may provide for a method of online identification and authentication, comprising generating a credential to represent a relationship between a first user and a second user based on a common ground of authenticated communication and exchanging the credential from the first user to the second user. The method may also provide for identifying, utilizing the credential, the second user to the first user, authenticating, utilizing the credential, the relationship between the first user and the second user, and initiating, upon authentication, a communication between the first user and the second user.

In one example, the method may include conducting, upon authentication, a transaction between the first user and the second user.

In another example, the credential represents a distinct identity for the first user.

In another example, a totality of credentials issued to and received by the first user over any ground of authenticated communication represents a cumulative identity of the first user.

In yet another example, the method may include generating an identity contact expression for the first user to describe the cumulative identity of the first user.

In still another example, the generation of the identity contact expression is dynamic.

Embodiments may also include at least one machine readable medium comprising a plurality of instructions that in response to being executed on a computing device, cause the computing device to carry out any of the examples of the aforementioned method, an apparatus for online identification and authentication comprising a device memory and logic configured to perform any of the examples of the aforementioned method, and a system for online identification and authentication comprising a first device memory. a second device memory. and logic configured to perform the method of any of the examples of the aforementioned method.

Still another embodiment may provide an apparatus comprising a memory device, a credential module to generate a credential to represent a relationship between a first user and a second user based on a common ground of authenticated communication, an exchange module to exchange the credential from the first user to the second user, and a public key hash module to generate, utilizing the credential, a public key hash value for the second user. The apparatus may also include an identity hash module a generate, utilizing the credential, a identity hash value for the second user and a contact pair module to generate, utilizing the public key hash value and the identity hash value, a contact pair. In addition, the apparatus may include a contact pair field module to generate, utilizing the contact pair, a contact pair field and an identity contact expression module to generate, utilizing the contact pair field, an identity contact expression to a represent a cumulative identity for the first user.

Yet another embodiment may provide a system comprising a communication network, a first user device including a memory device, and a second user device including a memory device. The system may also include a credential module to generate a credential to represent a relationship between a first user and a second user based on a common ground of authenticated communication, an exchange module to exchange the credential from the first user to the second user, and a public key hash module to generate, utilizing the credential, a public key hash value for the second user. The apparatus may also include an identity hash module a generate, utilizing the credential, a identity hash value for the second user and a contact pair module to generate, utilizing the public key hash value and the identity hash value, a contact pair. In addition, the apparatus may include a contact pair field module to generate, utilizing the contact pair, a contact pair field and an identity contact expression module to generate, utilizing the contact pair field, an identity contact expression to a represent a cumulative identity for the first user.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding. Any represented signal lines, whether or not having additional information, may actually include one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections and other components may or may not be shown within the figures, for simplicity of illustration and discussion, and so as not to obscure certain aspects of the embodiments of the invention. Further, arrangements may be shown in processing block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Several features and aspects of embodiments of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

We claim:

1. A method of online identification and authentication, comprising:
    generating a credential to represent a relationship between a first user of a first device and a second user of a second device based on a common ground of authenticated communication, wherein the credential includes a certificate that enables secure communications and transactions between the first user and the second user, and wherein the first user and the second user include an issuer of the credential and a receiver of the credential;
    exchanging the credential from the first user to the second user;
    generating, utilizing the credential, a public key hash value for the second user, wherein a public key of the second user is taken from the certificate;
    generating, utilizing the credential, an identity hash value for the second user, wherein an identity of the second user is taken from the certificate;
    generating, utilizing the public key hash value and the identity hash value, a contact pair for the second user;
    generating, utilizing the contact pair, a contact pair field, wherein the contact pair field includes contact pairs that represent all users that share a common ground of authenticated communication with the first user;
    generating, utilizing the contact pair field, an identity contact expression to represent a cumulative identity for the first user by incorporating all certificates affiliated with the first user; and
    securing communications between the first device and the second device by utilizing the identity contact expression.

2. The method of claim 1, wherein the public key hash value for the second user and the identity hash value for the second user are generated utilizing a cryptographic hash function.

3. The method of claim 1, wherein a cryptographic hash function utilized to generate the public key hash value is k bits long, wherein k is a non-zero positive integer.

4. The method of claim 1, wherein a cryptographic hash function utilized to generate the identity hash value is k bits long, wherein k is a non-zero positive integer.

5. The method of claim 1, wherein the contact pair field is represented by a Galois field with $2^k$ elements, and the public key hash value and the identity hash value are interpreted as k-bit elements of this field.

6. The method of claim 1, wherein the identity contact expression for the first user is generated utilizing a polynomial interpolation method.

7. The method of claim 6, wherein the identity contact expression is a polynomial mapping the public key hash value to the identity hash value.

8. The method of claim 1, wherein the generation of the identity contact expression is dynamic.

9. At least one non-transitory computer readable storage medium comprising a set of instructions for online identification and authentication, which, if executed by a processor, cause a computer to:
generate a credential to represent a relationship between a first user of a first device and a second user of a second device based on a common ground of authenticated communication, wherein the credential includes a certificate that enables secure communications and transactions between the first user and the second user, and wherein the first user and the second user are to include an issuer of the credential and a receiver of the credential;
exchange the credential from the first user to the second user;
generate, utilizing the credential, a public key hash value for the second user, wherein a public key of the second user is taken from the certificate;
generate, utilizing the credential, an identity hash value for the second user, wherein an identity of the second user is taken from the certificate;
generate, utilizing the public key hash value and the identity hash value, a contact pair for the second user;
generate, utilizing the contact pair, a contact pair field, wherein the contact pair field includes contact pairs that represent all users that share a common ground of authenticated communication with the first user;
generate, utilizing the contact pair field, an identity contact expression to represent a cumulative identity for the first user by incorporating all certificates affiliated with the first user; and
securing communications between the first device and the second device by utilizing the identity contact expression.

10. The at least one non-transitory computer readable storage medium of claim 9, wherein the public key hash value for the second user and the identity hash value for the second user are generated utilizing a cryptographic hash function.

11. The at least one non-transitory computer readable storage medium of claim 9, wherein a cryptographic hash function utilized to generate the public key hash value is k bits long, wherein k is a non-zero positive integer.

12. The at least one non-transitory computer readable storage medium of claim 9, wherein a cryptographic hash function utilized to generate the identity hash value is k bits long, wherein k is a non-zero positive integer.

13. The at least one non-transitory computer readable storage medium of claim 9, wherein the contact pair field is represented by a Galois field with $2^k$ elements, and the public key hash value and the identity hash value are interpreted as k-bit elements of this field.

14. The at least one non-transitory computer readable storage medium of claim 9, wherein the identity contact expression for the first user is generated utilizing a polynomial interpolation method to generate a polynomial to map the public key hash value to the identity hash value.

15. The at least one non-transitory computer readable storage medium of claim 14, wherein the identity contact expression is a polynomial mapping the public key hash value to the identity hash value.

16. The at least one non-transitory computer readable storage medium of claim 9, wherein the generation of the identity contact expression is dynamic.

* * * * *